United States Patent [19]
Buttafava

[11] 3,745,436
[45] July 10, 1973

[54] CONTINUOUS MODE MOTOR SPEED CONTROL SYSTEM

[75] Inventor: Pietro Buttafava, Milano, Italy

[73] Assignee: Honeywell Information Systems Italia, Caluso, Italy

[22] Filed: Aug. 14, 1972

[21] Appl. No.: 280,702

[30] Foreign Application Priority Data

Aug. 26, 1971 Italy .............................. 27871 A/71

[52] U.S. Cl. .................. 318/464, 318/327, 318/345, 318/480

[51] Int. Cl. ............................................. H02p 5/06

[58] Field of Search .................... 318/327, 345, 450, 318/464, 480

[56] References Cited

UNITED STATES PATENTS

| | | | |
|---|---|---|---|
| 3,185,364 | 5/1965 | Kleist | 318/327 UX |
| 3,293,522 | 12/1966 | Lewis | 318/327 |
| 3,510,742 | 5/1970 | Pooley | 318/480 X |
| 3,614,757 | 10/1971 | Burr | 318/341 X |

*Primary Examiner*—B. Dobeck
*Attorney*—Aubrej C. Brine et al.

[57] ABSTRACT

A control system for regulating low-inertia d.c. motors, such as employed in magnetic tape transports for data handling systems, is provided, which employs a single regulator amplifier while the current regulating circuit includes a diode-resistor passive circuit having a precisely adjustable range of no response.

2 Claims, 5 Drawing Figures

CONTINUOUS MODE MOTOR SPEED CONTROL SYSTEM

BACKGROUND OF THE INVENTION

The present invention relates to a regulation and control system for low-inertia d.c. motors, and more particularly, a system of this type for motors employed in magnetic tape transport units for data-handling systems.

It is known that magnetic tape recording units must provide a number of mechanical operations for handling the magnetic tape operations which:

a. Drive the tape at a constant, very precisely regulated speed, during reading and recording operations, the driving operation being performed either in the forward or in the backward direction;

b. Start the tape and bring it to the required speed in a very short time;

c. Stop the motion of the tape; and d. Rewind the tape at a maximum speed.

As the tape may be damaged by improper handling, it is essential that it not be submitted to unnecessary stresses. Therefore, the accelerations involved in starting, stopping and high speed rewinding must be precisely controlled and kept within prefixed limits.

In the most modern tape units, the tape is driven by a single capstan, over the periphery of which the tape is partially wound. Two air-depression chambers on both sides of the capstan provide for an adequate tensioning of the tape to avoid slipping, and at the same time provide buffering facilities, interposed between the unwinding and rewinding spools and the capstan.

The capstan is driven by a low-inertia motor controlled by proper regulating circuits, and the speed control is usually obtained by means of a closed-loop regulation circuit generally comprising a dynamo-tachometer and an amplifier.

This arrangement however, has drawbacks resulting in instability and high frequency oscillations due to the noise affecting the signal generated by the dynamo-tachometer, and to the resonant frequency of the system comprising the dynamo, the motor and the capstan.

Such drawbacks may be substantially obviated by reducing the maximum frequency response of the amplifier included in the regulation loop, but this causes an increase in the response time of the control system.

The regulation of the starting and stopping operations, which call essentially for feeding the motor by a direct current of constant value, is usually obtained either by using, in the control circuit, saturating amplifiers, that is, amplifiers which cannot deliver a current greater than a fixed value, or by using a second regulation loop to control the feeding current of the motor.

In any case, selecting means must be provided, to achieve the control of the system either by a voltage control device, or by a current control device, according to requirements. More specifically, circuital means must be provided for operating the current control system during the accelerating stage, until a speed sufficiently close to the constant reading and recording speed is reached, and during the braking stage, until the motor is stopped. During the reading and recording stage, these circuital means must operate the constant speed control circuit.

These circuital means contribute heavily to the complexity and cost of the whole system.

SUMMARY OF THE INVENTION

These inadequacies are obviated by the control system according to the invention, whereby the current control circuit is automatically switched on in the starting stage, for limiting the current, thus substituting its action for the speed control circuit. During the stopping stage, the current control system is active for a fixed time interval, after which it is switched off.

The system according to the invention has the advantages of permitting the use of speed detecting devices other than the dynamo-tachometer, as for instance, the frequency-voltage converter described in U.S. Pat. application Ser. No. 225,887, filed February 14, 1972 and assigned to the assignee of the present invention.

This speed detecting device has the advantage of substantially reducing the noise and disturbances introduced into the speed control circuit and therefore a single amplifier may be used both for the speed and the current controlling circuits. This single amplifier has a high frequency response, thus allowing a very prompt regulating action without any danger of self sustained oscillations.

According to one aspect of the invention, the control system includes a single regulator amplifier.

According to a second aspect of the invention, the current regulating circuit includes a diode-resistor passive circuit having a precisely adjustable range of no response.

DESCRIPTION OF THE DRAWINGS

These and other features and advantages of the invention will be apparent by the following detailed description of a preferred embodiment thereof, with reference to the attached drawings, wherein.

Figure 1:
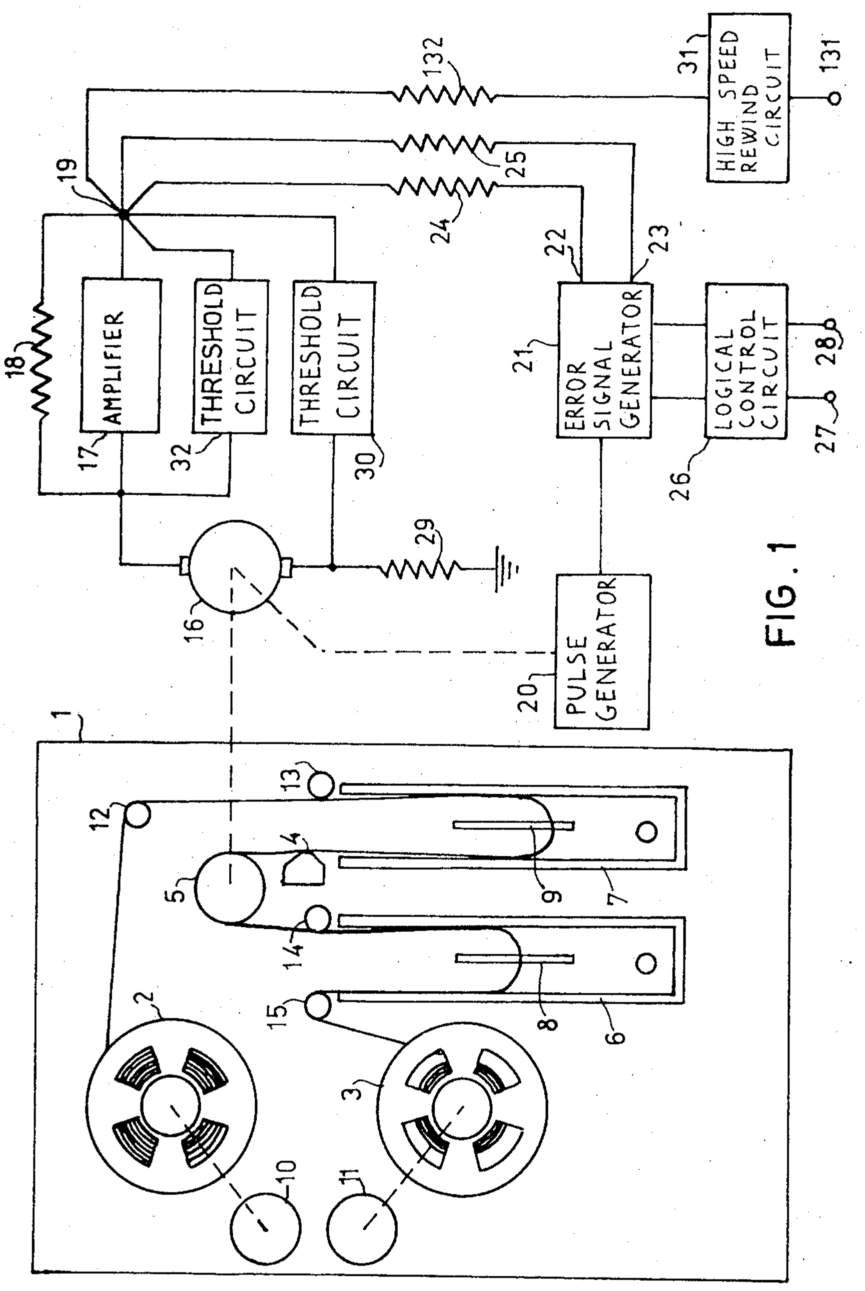
FIG. 1 is a simplified block diagram of a control system according to the invention.

The elements depicted at the left side of FIG. 1 show in schematic form a typical magnetic tape recording unit, to which the control system according to the invention may be conveniently applied. Only the devices involved in driving the tape are represented, as they are considered to be only those essential for a complete understanding of the invention.

The mechanical members of the driving device are mounted on a front panel 1 and comprise two spools 2 and 3 which alternatively operate as unwinding and rewinding spools, according to the direction of the motion of the magnetic tape. The magnetic tape is driven under a reading and recording head 4, and its motion is caused by a capstan 5, around which the tape is partially wound. Two air-depression chambers 6 and 7 provide a proper tensioning of the tape to avoid slipping, and to ensure the effective driving of the tape even under a considerable acceleration. In addition, the air-depression chambers provide accommodation for tape loops of sufficient length, thus relieving the spools from the necessity of promptly following the changes in the tape motion.

The air-depression chambers are provided with proper sensing means 8 and 9, which sense the length of the tape loop and supply a proper signal to the spool driving motors 10 and 11 for maintaining the length of the tape loop at a median value independently of the speed of the tape. The tape is further supported and guided through the rollers 12, 13, 14, 15 which substantially eliminates friction and wear.

As stated, the tape is driven by the capstan 5 fixedly mounted on the shaft of a low-inertia, direct-current motor, 16, having separate constant excitation energy.

It is known that the torque of a constant excitation d.c. motor is proportional to the feeding current, and that, in steady conditions, the rotation speed depends on the feeding voltage. Therefore, if the load torque is negligible, and the moment of inertia of the rotating system is constant, the acceleration or deceleration of the motor is proportional to the feeding current.

The speed of the tape can therefore be controlled and kept to a prescribed value by regulating the feeding voltage, and the acceleration or deceleration to which the tape is subjected during the starting and stopping stages may be controlled by regulating the feeding current.

Moreover, starting and stopping the motor at constant acceleration condition reduces to a minimum the starting and stopping times, and likewise by the stress imported to the tape, thus improving the performance of the tape handling unit.

The voltage and current regulations are obtained, according to the invention, by the circuit schematically illustrated at the right side of FIG. 1.

The motor 16 is fed by an amplifier 17 comprising for instance a first preamplifier stage and a second power stage.

The preamplifier may conveniently consist of an operational amplifier, and the whole amplifier device is provided with a suitable feed-back through a resistor 18. The amplifier 17 supplies the motor 16 with a positive or negative feeding voltage depending on the regulation signal applied to an input node 19.

A pulse generator 20, supplying pulses with a repetition rate proportional to the rotating speed of the motor is associated with the motor 16. The repetition period is compared to a reference period by the error signal generating circuit 21, the reference period corresponding to the nominally required motor speed.

The error signal generating circuit may supply either one of two symmetrical positive or negative voltage signals, representative of the difference between measured period and reference period. This error signal is applied through a lead 22 or 23 and resistors 24 or 25 to the input node 19 and to the regulating amplifier 17, thus regulating the voltage delivered by the amplifier. Either the positive or the negative signal is applied to the input, according to the required direction of rotation of the motor 16.

The selection of the signal to be applied to the motor 16 is controlled by a logical control circuit 26 provided for instance with two inputs 27 and 28 for applying respectively a first binary signal for controlling the motion or the rest condition, and a second binary signal indicative of the required forward or backward direction of the motion.

The amplifier 17, the motor 16, the pulse generator 20, the error signal generator 21 and resistors 24 or 25 constitute a closed regulation loop for controlling the speed of the motor.

The motor feeding current passes through a resistor 29 series connected to the rotor winding of the motor 16 and as a consequence the voltage across the resistor 29, which will be hereinafter indicated by $e_1$, is proportional to the current and therefore to the torque and to the acceleration of the motor. This voltage is applied through a passive threshold circuit 30 to the junction 19 and provides the system with a second closed regulation loop, for controlling the current and consequently the acceleration.

As explained hereinafter, this current regulation loop is automatically included and excluded, as required during the starting and stopping operations, and does not interfere with the voltage regulating loop during the operation at constant regulated speed. On the other hand, during the starting and stopping operation the speed regulation circuit does not appreciably interfere with the current regulating circuit.

The control and regulating system is completed by a circuit 31 for high speed rewinding. In response to a rewinding control signal applied to terminal 131, this circuit applies to a resistor 132 connected to the input of the amplifier 17, through the node 19, a voltage which initially increases at a substantially linear rate, and thereafter becomes constant, thus driving the motor 16 initially at a constant acceleration, and thereafter at a prefixed rewinding speed. A detailed description of this circuit is not relevant for an understanding of the invention, and therefore will not be given here.

As a further improvement, the amplifier 17 is provided with a threshold circuit 32 which provides a no-response voltage range around the zero voltage to prevent the capstan from slowly rotating in response to amplifier drift or to noise, during the rest condition, that is when node 19 is not fed. This circuit is known by anyone skilled in the art and is therefore not described.

Hereafter, the units composing the system will be considered in greater detail.

THE AMPLIFIER

Figure 2:
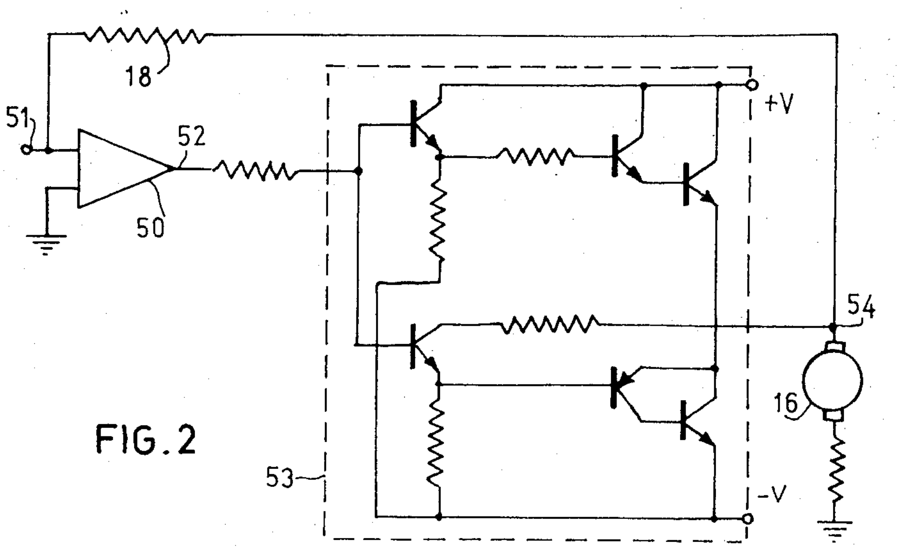
FIG. 2 is a simplified wiring diagram of an amplifier employed according to the invention.

FIG. 2 shows a preferred embodiment of the amplifier 17. It comprises a high-gain differential preamplifier 50 having the non-inverting input connected to ground, and using as an input terminal 51 the inverting input. Therefore, the amplifier acts as inverter amplifier, positive input voltage at the input providing negative amplified output voltages, and vice-versa.

Such amplifiers are commercially available as integrated circuits and are marketed by a number of producers, and therefore further details thereof are considered unnecessary for an understanding of the invention.

The voltage supplied by the amplifier 50 at the output terminal 52 is applied to a power amplifier 53, comprising transistors and resistors, as shown in FIG. 2. The purpose of the amplifier 53 is not to change the input voltage, but merely to supply a current of an intensity suitable for driving the motor 16. Therefore, the transistors employed for this purpose are conveniently connected as emitter-followers, and the voltage at the output terminal 54 of the amplifier 53 as supplied to the motor, is substantially equal to the input voltage at terminal 52. The voltage gain is therefore due only to the differential amplifier 50, and the power amplifier 53 may be overlooked, as long as the voltage gain is discussed.

A feedback resistor 18 of suitable value connects the output terminal 54 to the input terminal 51.

It is known that, if a differential amplifier has a voltage gain and an input impedance sufficiently high, and if an input signal is applied to the inverting input through an input resistance, the resulting gain A' is given with sufficient approximation by $A' = R_f/R_a$, where $R_f$ is the feedback resistance and $R_a$ the input resistance.

This result is easily obtained by applying Kirkhoff's law to the input node, assuming the input impedance of the amplifier to be infinite and the voltage deviation of the input terminal from ground to be negligible. The sum of the currents converging on the input node must be zero: therefore, if $e$ is the output voltage and $e_1$ the voltage applied to the input through $R_a$, it follows that;

$$(e_i/R_a) + (e/R_f) = 0 \text{ that is } E = e_i\,(-R_f)/R_a.$$

This equation, which is better explained for instance in the book of Milan & Taub, Pulse Digital and Switching Waveform published by McGraw-Hill, 1965, $13/R_{a3}) + (e_{in}/R_{1-8},$ is important because it allows one to find the response of an amplifier in case where a plurality of input signals are applied through different input resistances.

It will be, in the latter case;

$$(e_{i1}/R_{a1}) + (e_{12}/R_{a2}) + (e_{in}/R_{an}) + (e/R_f) = 0$$

that is;

$$e = -(R_f e_{i1}/R_{a1} + R_f e_{i1}/R_{a2} + \ldots R_f e_{in}/R_{an}).$$

This is the case of the described system, wherein (FIG. 1) different signals, supplied by the current limiting circuit, the rewinding control circuit, and the speed control circuit are applied to the input node 19 of the amplifier.

THE SPEED REGULATION LOOP

Figure 3:
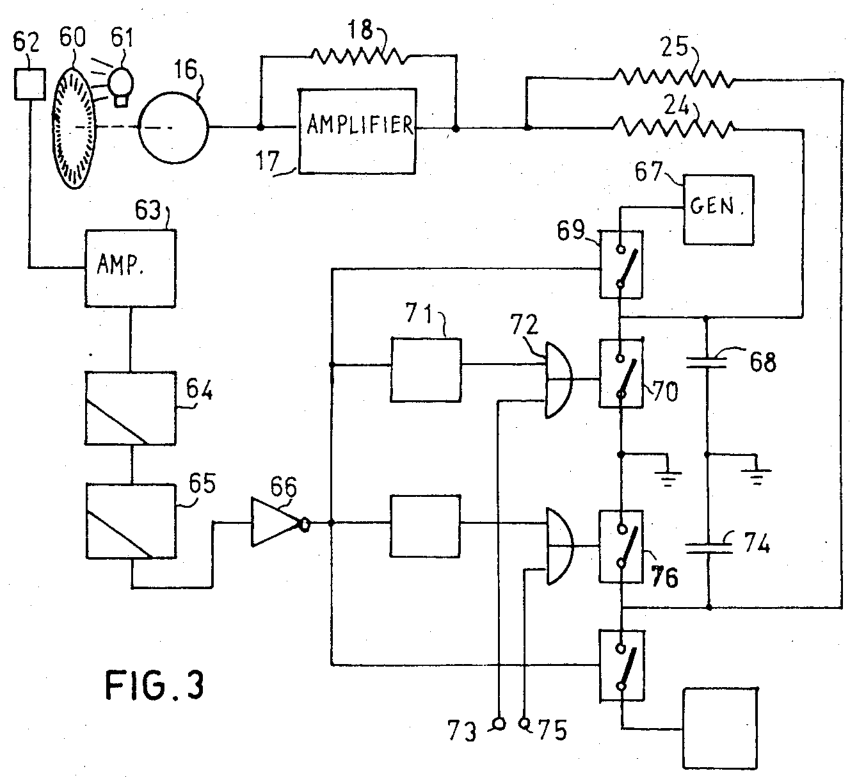
FIG. 3 is a simplified block diagram of a speed control loop according to the invention.

As stated above, the speed regulation is obtained by a frequency-voltage converter. This converter is the object of the above-mentioned patent application wherein a preferred embodiment is described in detail. The essential aspects thereof, useful for an understanding of the invention, are herein described, with reference to FIG. 3.

An opaque disk 60 provided with transparent slots on its periphery is fixedly mounted on the shaft of the motor 16 and rotates with the same.

The disk 60 is interposed between alight source 61 and a photosensitive element 62 in such a way, that during the rotation the photosensitive element is periodically illuminated, thus supplying a pulsing electrical signal having a repetition rate proportional to the motor speed.

This signal is applied to a clipping amplifier 63, which therefore produces a square wave signal having the same period as the signal supplied by the photosensitive element. This signal controls a pulse generator circuit 64, which supplies in response thereto very short pulses having the same repetition frequency.

These pulses are applied to a high precision, rapid recovery, one shot circuit 65 which supplies pulses of prefixed duration T*o*. The output signal, after invertion by an inverter 66, is therefore formed by a sequence of pulses of a period equal to the repetition rate of the pulses of a period equal to the repetition rate of the pulses supplied by the photosensitive element, and having a duration equal to the difference between the period of said pulses and the reference period T*o*. Thus the duration of said pulses is proportional to the error of the actual pulse period with respect to the reference period, which may be set to substantially correspond with the nominal speed of the motor.

The error signal supplied by the inverter 66 controls two integrating circuits.

One of these circuits, for instance, comprises a constant current generator 67, a capacitor 68, a first switching device (preferably a solid state one) 69, controlled by inverter 66 for connecting the current generator 67 to the capacitor 68 for the duration of the error pulses, a second switching element 70 for short-circuiting the capacitor 68 at predetermined instants and for very short intervals, which however are sufficient to discharge the same.

The switching element 70 is controlled by the inverter 66 through a differentiating circuit 71 which, in correspondence with the rise fronts of the pulses supplied by the circuit 66 delivers very short pulses which control the closing of the switch element 70.

An OR gate 72 at the input of the switch 70 is provided to enable the operation of the switch under the control of an external binary signal applied to the terminal 73.

The second integrating circuit is substantially identical to the first one, but provides for charging the second capacitor 74 by a voltage of opposite polarity.

This integrator circuit is provided with an OR gate controlled by the external terminal 75 to enable the operation of the short-circuit switch 76.

As explained in more detail by the above-mentioned patent application, the purpose of these integrating circuits is to convert the error pulses in a voltage proportional to their duration. To effect this, the capacitors are discharged at the beginning of the error pulse, and then they are charged by a constant current for the whole duration of the pulse. The stored charge is maintained until the beginning of the following pulse, then discharged, and the process is repeated.

The voltage across the capacitor terminals, which is proportional to the duration of the pulse, and therefore to the difference between actual and nominal value of the motor speed, is applied through one of the two resistors 24 and 25 to the input of the amplifier 17 which feeds the motor 16. The operation of the described regulation loop being briefly, as set forth below.

In the rest condition, both the integrators are inhibited, that is, binary level ONE signals are applied at the control input terminals 73 and 75, so that switches 70 and 76 are closed and the capacitors 68 and 74 are discharged. In this condition a null voltage is applied to the input of the amplifier 17 through the resistors 24 and 25, and the motor 16 is at rest. To start the motor in a required direction, the signal applied to one of the control terminals, for instance terminal 73, is brought to binary ZERO. Thus, the switch 70 is open and capacitor 68 is charged. As the motor 16 is at rest, the pulse generator 64 does not deliver any pulse, the output of inverter 66 is at binary ONE, thus closing the switch 69. The capacitor 68 is therefore charged up to the maximum voltage delivered by the constant current generator 67. If $V_{isat}$ is this saturation voltage, and $R_i$ is the resistance of resistor 24, the motor 16 is fed by a voltage $e = -(R_f/R_i)\ V_{isat}$, which starts the motor under a very high acceleration, towards the steady state speed.

However, with the increase of the motor speed, the duration of the error pulses decreases and, at a speed sufficiently close to the required regulated speed the error voltage $V_i$ decreases, the motor feeding voltage also decreases, and the speed is stabilized at a value lower than the nominal speed, but very close to the same.

As the frequency-voltage converter system may be designed to produce a considerable voltage swing for small speed variations, the operational amplifier is not required to have high gain: $R_f$ and $R_i$, that is, resistor 18 and, for instance, resistor 24 may have slightly different values, for instance, respectively 1 MOhm and 800 KOhm, so that the gain is close to unity. Therefore, the noise disturbances are not amplified. With regard to the setting up of self-sustained oscillations due to the tersional elasticity of the system motor-photodisk, these oscillations have a very definite frequency. Therefore, it is possible by suitable attenuation networks to ensure that, for such frequency, the phase margin of the regulating circuit is sufficiently high to prevent such self-sustained oscillation.

The regulation system may therefore be designed to have a very high frequency response, thus providing a very fast regulating action, while preventing the hazard of self-sustained oscillations due to the characteristics of the system, or to disturbances.

THE CURRENT LIMITER

Figure 4:
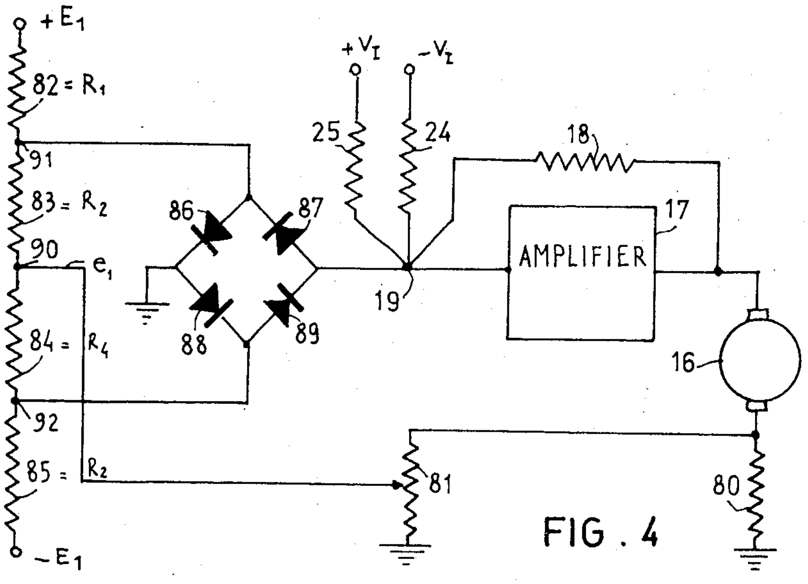
FIG. 4 is a wiring diagram of a current limiting circuit, that is, of an acceleration control loop according to the invention.

FIG. 4 shows the wiring diagram of a preferred embodiment of the current limiting circuit. It comprises a resistor 80 series connected to the armature winding of the motor 16, a voltage divider 81 which can also be omitted, a set of four series connected resistors 82, 83, 84, 85 and a set of diodes 86, 87, 88, 89.

The end terminals of the series connected resistors 82 to 85 are fed by two equal but opposite voltage sources $+E_1$ and $-E_1$, for instance +15 and −15 V.

The middle point of the series of resistors, that is node 90, common to resistors 83 and 84, is connected to the intermediate point of the voltage divider 81, which is parallel connected to resistor 80.

The values of resistor 80 and of the voltage divider 81 may be chosen conveniently low with respect to the values of the resistors 82 to 85, so that the voltage $e_1$, of node 90 is substantially proportional to the voltage drop caused by the motor 16 feeding current across the resistor 80.

For instance, it has been found that suitable values are 0.25 Ohm for resistor 80, 500 Ohm for voltage divider 81, whereas for resistors 82 and 85 the resistance values $R_1$ and $R_2$ may be larger than 150 KOhm, and for resistors 83 and 84 the resistance values $R_3$, $R_4$ may be larger than 10 KOhm. The node 91 which is the middle point between resistors 82 and 83, is connected to the anode of the diode 86 which has its cathode connected to ground, and to the cathode of diode 87 which has its anode connected to the node 19, and input to the amplifier 17.

In the same way, the node 92 common to resistors 84 and 85 is connected to the cathode of diode 88 having the anode connected to ground, and to the anode of diode 89 having the cathode connected through junction 19 to the input of the amplifier 17. The circuit comprising resistors 82 to 85 and the diodes 86 to 89 applies a regulation voltage to node 19 only if voltage $e_1$ at node 90 is higher than a predetermined positive value or lower than a corresponding negative value. For voltage values comprised between said limits the connection to node 19 is open, and the current limiting circuit is not effective.

The limits of this no-response gap may be determined by considering that the node 19 is virtually at ground voltage.

Considering the circuit formed by resistors 82 and 83 and diodes 86 and 87, the node 19 is connected to node 91 only if diode 87 is conducting. In this condition the current through resistor 82 is lesser than the current through resistor 83. Moreover, if diode 87 is conducting and its voltage drop is negligible, node 91 also is virtually at ground.

Therefore it follows that;

$$E_1/R_1 < -e_1/R_3 \text{ and therefore } e_1 < -(E_1R_3/R_1).$$

This is the lower threshold limit for the node 19 to be connected to the limiting circuit. For values of $e_1$, lower than this threshold, diodes 86 and 89 are backward biased and therefore do not conduct.

The upper threshold limit is defined in the same way by values of resistors 84 and 85, therefore the node 92 is effectively connected to node 19 only if the current through resistor 84 is larger than the current through resistor 85 which is defined by;

$$e_1/R_4 > E_1/R_2, \text{ that is } e_1 > E_1R_4/R_2$$

The connection to node 19 is therefore open for values of $e_1$ comprised between;

$$-E_1R_3/R_1 \leq e_1 \leq E_1R_4/R_2.$$

Taking into account the voltage drop Δ across the diodes, the exact limits are:

$$-(E_1 + \Delta)\ R_3/R_1 - \Delta \leq e_1 \leq (E_1 + \Delta)\ R_4/R_2 + \Delta.$$

These threshold values, depending substantially on resistive parameters and on voltage $E_1$, which may be suitably stabilized, are capable of being calibrated with high precision and enjoy a high inherent stability.

Consider now the operation of the regulation loop comprising the current limiting circuit. Suppose the motor has to be started: the speed regulating system will supply an error voltage (for instance $-V_i$) relatively high, which, applied through resistor 24 to the amplifier 17 will cause a considerable current to be delivered to the motor. Consequently, the voltage drop across resistor 80 will cause a voltage $e_1$ which exceeds the limits of the no-response gap, and which therefore connects the current limiting circuit to the amplifier.

Applying Kirkhoff's law to node 19, which is virtually at null voltage, it will follow that:

$$e/R_f = V_i/R_i - e_1/R_4 + E_1/R_2$$

or, taking into account the voltage drop across the diodes;

$$e/R_f = V_i/R_i - (e_1 - \Delta)\ /R_4 + (E_1 + \Delta)/R_2,$$

that is;

$e = V_i R_f/R_i + [\ (E_1 + \Delta)/R_2 + \Delta/R_4)R_f - e_1 R_f/R_4].$

The amplifier output voltage e is therefore a function of $e_1$ as well as of $V_i$.

As $R_4$ may be chosen of a substantially lower value than $R_f$, for instance at the ratio 1/100, and, as said, $R_i$, that is the resistance of resistor 24 or 25 is slightly less than to $R_f$, the regulating action due to $e_1$, is largely prevalent over the effect of possible variations of $V_1$ as long as $e_1$ is higher than the threshold value. Thus an effective current regulation is achieved. On the other hand, as long as the speed of the motor is substantially different from the desired steady state value, the voltage regulating circuit supplies a practically constant saturation voltage $V_{isat}$ which provide a sufficient driving torque for accelerating the motor, until close to the regulated speed.

In case the motor is started in the opposite direction the regulation equation is:

$$-e/R_f = -V_i/R_i + e_1/R_3 - E_1/R_1$$

and more precisely:

$$-e = -V_i R_f/R_i - [\ (E_1 + \Delta)/R_1 + \Delta/R_3]\ R_f + e_1 R_f/R_3.$$

In both cases, as long as $e_1$ exceeds the threshold values, the regulating current circuit acts as a current limiter.

When the speed of the motor has reached a value suitably close to the required steady state value, the feeding voltage $V_i$ decreases, the driving current decreases, and the voltage $e_1$, proportional to the driving current, falls under the threshold value, and the current limiting loop is automatically disconnected. The only regulation now active is the speed regulation.

THE STOPPING OPERATION

The braking operation for stopping the motor is also controlled by the limiting current loop, and takes place under constant deceleration.

However, as the tachometric device employed is unable to provide a useful indication for null or near-null speed, the on and off switching of the circuit is controlled differently. The beginning of the braking operation is obtained by inhibiting the section of the frequency-voltage voltage converter (FIG. 3) which is active in providing a speed regulating signal. and enabling the inactive one.

Thus, the regulating voltage applied to amplifier 17 is inverted. A braking torque is therefore applied to the motor, which causes the error signal supplied by the frequency-voltage converter to increase, thus further enhancing the braking torque. The increase of the braking current causes the voltage $e_1$ to exceed the threshold value, thus automatically switching in the current regulating circuit. The braking takes place at constant current and therefore at constant deceleration.

After a prefixed time interval, obtained by means of a one-shot circuit, and corresponding to the time required for reaching the stop condition, the active section of the frequency-voltage converter is also inhibited, thus bringing to zero value the speed regulating voltage. Therefore, the feeding current of the motor decreases, the voltage $e_1$ becomes lower than the threshold value, and the current limiting circuit is switched off.

The only signal applied to the amplifier input is the feedback voltage. Therefore, the amplifier does not supply any current and becomes inactive, and thus the motor stops.

THE CONTROL LOGIC

To complete the description of the system according to the invention a brief description of the control logic providing for the operation of the device will be given herein.

Figure 5:
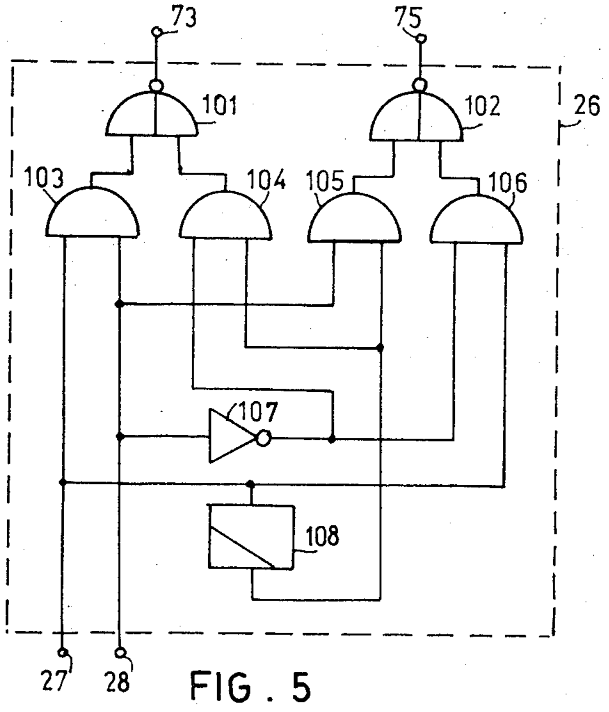
FIG. 5 is a block diagram of a logic control circuit according to the invention.

In FIG. 1 the logic circuit is schematically represented by the block 26 having two output leads 73 and 75 for controlling the two sections of the error signal generator 21, and two input leads 27 for start-stop control, and 28 for forward-backward motion control. FIG. 5 is the logical diagram of block 26. It comprises two NOR gates 101 and 102, provided with two inputs, four AND gates 103, 104, 105, 106, inverter 107 and one-shot circuit 108.

The input lead 27 for the start-stop signal is connected to a first input of AND gates 103 and 106, and to the input of one-shot 108.

The input lead 28 for the forward-backward signal is directly connected to a second input of AND gate 103, to a first input of AND gate 105, and through the inverter 107, to a first input of AND gate 104 and to a second input of AND gate 106. The second inputs of AND gates 104 and 105 are connected to the output of the one-shot 108.

The outputs of AND gates 104 and 105 are connected by means of the NOR gate 101 to the output terminal 73 for controlling a first section of the error generator and the outputs of AND gates 105 and 106 are connected through NOR gate 102 to the terminal 75 for controlling the second section of the error generator.

The operation of the control logic is as follows: a binary signal applied to input 28 determines the direction of rotation of the motor. For instance, a binary level ONE at input 28 enables the AND gates 103 and 105 and inhibits the AND gates 106 and 104.

A start signal of binary level ONE applied to input 107 is transferred and inverted through AND gate 103 and NOR gate 101 to the terminal 73, thus activating a first section of the error signal generator 21, as explained before. When this starting signal is removed, that is, its binary level goes down to ZERO, the falling front applied to the input of the one-shot 106 causes its output to supply a pulse of binary level ONE of a prefixed duration. This pulse is transferred and inverted through AND gate 105 and NOR gate 102 to the terminal 75. This signal, applied to the second section of the error generator, causes the braking and stopping of the motor, as explained heretofore.

In the same way, when the binary signal applied to input 28 is at level ZERO, the starting signal is applied through AND gate 106 and NOR gate 102 to terminal 75, and the stopping signal is applied through AND gate 104 and NOR lower 101, to terminal 73.

While it is intended that the schematic diagrams and circuits described herein be related to a preferred embodiment, it should be understood that a plurality of changes may be introduced thereto by one skilled in the art without departing from the spirit and scope of the invention.

What is claimed is:

1. A regulating system for starting and stopping a low-inertia d.c. motor under constant acceleration, and for driving said motor at a constant predetermined speed, comprising:

a bidirectional differential amplifier provided with negative feedback, having an input node and an output terminal for feeding current to the motor, a tachometric device for supplying pulses having a repetition rate proportional to the motor speed, a comparator circuit for supplying two error signals of opposed polarity and same voltage value proportional to the difference between the period of said pulses and a reference period, speed control means for selectively applying a first one of said error signals to the input node of said amplifier through a first resistor of suitable value, the resulting speed regulating loop having an overall voltage gain substantially close to unity, means for selectively applying a current limiting signal proportional to the motor feeding current to said input node through a second resistor of a suitable value, the resulting current regulating loop having an overall voltage gain substantially higher than the unity, threshold means for applying said current limiting signal to said input node whenever said current limiting signal has an absolute value higher than a prefixed threshold value, said current limiting means being therefore ineffective whenever the speed of the motor is suitably close to the constant speed value regulated by said speed regulating loop, means for applying the second one of said error signals in place of said first one to said input node in response to stop signal, for providing a current limiting signal during the deceleration of the motor, and means for switching off said second error signal a predetermined time after said stop signal.

2. The regulating system of claim 1, wherein said current limiting means comprise a first and a second voltage divider serially connected between two stabilized current sources of opposite polarity; and a diode bridge comprising four diodes serially connected to form a closed circuit, the connection point between a first and a second diode being grounded, the connection point between a third and a fourth diode being connected to said input node, the connection points between said fourth and first diodes, and between said second and third diodes being respectively connected to the intermediate points of said first and said second voltage dividers, the point common to said voltage dividers being connected to a voltage source proportional to the current feeding the motor.

* * * * *